United States Patent
Soifer et al.

(10) Patent No.: US 11,789,689 B2
(45) Date of Patent: Oct. 17, 2023

(54) PROCESSING DIGITAL AUDIO USING AUDIO PROCESSING PLUG-INS EXECUTING IN A DISTRIBUTED COMPUTING ENVIRONMENT

(71) Applicant: MICROSOFT TECHNOLOGY LICENSING, LLC, Redmond, WA (US)

(72) Inventors: Jonathan Andrew Soifer, Redmond, WA (US); Anchit Koul, Redmond, WA (US); Jeffrey Song Zhu, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 105 days.

(21) Appl. No.: 15/876,038

(22) Filed: Jan. 19, 2018

(65) Prior Publication Data
US 2019/0227765 A1    Jul. 25, 2019

(51) Int. Cl.
*G06F 3/16* (2006.01)
*G06F 9/54* (2006.01)
(Continued)

(52) U.S. Cl.
CPC .............. *G06F 3/162* (2013.01); *G06F 3/165* (2013.01); *G06F 9/44526* (2013.01);
(Continued)

(58) Field of Classification Search
CPC ...... G06F 3/162; G06F 3/165; G06F 9/44526; G06F 9/547; G06F 3/04847; H04L 67/42
See application file for complete search history.

(56) References Cited

U.S. PATENT DOCUMENTS 6,289,382 B1 * 9/2001 Bowman-Amuah ........................ G06F 13/387 709/226
7,302,396 B1 * 11/2007 Cooke .................. G11B 27/038 704/500

(Continued)

OTHER PUBLICATIONS

"Audio Plugins", Retrieved from<<https://web.archive.org/web/20140818183824/https:/support.steampowered.com/kb_article.php?ref=5828-WIFZ-6347>>, Aug. 18, 2014, 1 Page.

(Continued)

*Primary Examiner* — Chris Parry
*Assistant Examiner* — Dixon F Dabipi
(74) *Attorney, Agent, or Firm* — Newport IP, LLC; Leonard J. Hope

(57) ABSTRACT

An audio processing plug-in shim operates in conjunction with a plug-in host application executing on a computing device. The plug-in shim receives a stream of digital audio from the plug-in host application and transmits the digital audio to a network service executing in a network accessible remote distributed computing environment. The network service receives the digital audio and routes the digital audio to one or more audio processing plug-ins, also executing in the distributed computing environment. The audio plug-ins process the digital audio, such as by applying digital signal processing techniques to the digital audio, and return processed audio to the network service. The network service returns the processed audio to the plug-in shim executing on the remote computing device. The plug-in shim, in turn, receives the processed audio from the network service and provides the processed audio to the plug-in host application.

12 Claims, 11 Drawing Sheets

(51) Int. Cl.
  *G06F 9/445* (2018.01)
  *G06F 3/04847* (2022.01)
  *H04L 67/01* (2022.01)

(52) U.S. Cl.
  CPC .......... *G06F 9/547* (2013.01); *G06F 3/04847* (2013.01); *H04L 67/01* (2022.05)

(56) References Cited

U.S. PATENT DOCUMENTS

| | | | | |
|---|---|---|---|---|
| 7,467,392 | B1* | 12/2008 | Ludwig | G06F 9/4411 |
| | | | | 710/19 |
| 9,196,236 | B1* | 11/2015 | Buese | H04H 60/04 |
| 9,264,835 | B2 | 2/2016 | Condit et al. | |
| 9,846,682 | B1* | 12/2017 | Righetto | G06F 40/106 |
| 2007/0100482 | A1* | 5/2007 | Cotey | G06F 3/165 |
| | | | | 700/94 |
| 2007/0239780 | A1* | 10/2007 | Hugill | G11B 27/329 |
| 2008/0240454 | A1* | 10/2008 | Henderson | G10H 1/0066 |
| | | | | 381/61 |
| 2009/0076816 | A1* | 3/2009 | Bradford | G10L 21/06 |
| | | | | 704/235 |
| 2010/0106849 | A1* | 4/2010 | Chou | H04N 21/437 |
| | | | | 709/231 |
| 2010/0180224 | A1* | 7/2010 | Willard | G10H 1/0025 |
| | | | | 715/773 |
| 2011/0081027 | A1* | 4/2011 | Densham | G10L 19/005 |
| | | | | 704/226 |
| 2014/0337420 | A1* | 11/2014 | Wentzloff | H04N 21/274 |
| | | | | 709/204 |
| 2015/0066175 | A1 | 3/2015 | Tremblay et al. | |
| 2016/0350064 | A1* | 12/2016 | Miwa | G06F 3/162 |
| 2017/0098452 | A1 | 4/2017 | Tracey et al. | |
| 2018/0060788 | A1* | 3/2018 | Mase | G06F 16/25 |
| 2018/0190250 | A1* | 7/2018 | Hiskey | G10H 1/46 |
| 2018/0210694 | A1* | 7/2018 | Borthwick | G06F 3/162 |
| 2018/0332115 | A1* | 11/2018 | Mase | H04L 67/42 |
| 2019/0227765 | A1* | 7/2019 | Soifer | G06F 3/162 |
| 2021/0082391 | A1* | 3/2021 | Reiss | G10H 1/0091 |

OTHER PUBLICATIONS

"CloudBounce", Retrieved from<<https://web.archive.org/web/20170603211057/https:/cloudbounce.com/>>, Jun. 3, 2017, 5 Pages.
"Introducing the MAQ", In Audio Developer Conference, Nov. 13, 2017, 2 Pages.
"Ohmstudio", Retrieved from<<https://web.archive.org/web/20130708153223/https:/www.ohmforce.com/OhmStudio.do>>, Jul. 8, 2013, 2 Pages.
Bracko, Shane, "Top 7 Cloud-based Digital Audio Workstations", Retrieved from<<https://www.techflier.com/2016/03/04/top-7-cloud%E2%80%90based-digital-audio-workstations/>>, Mar. 4, 2016, 11 Pages.

* cited by examiner

PROCESSING DIGITAL AUDIO USING AUDIO PROCESSING PLUG-INS EXECUTING IN A DISTRIBUTED COMPUTING ENVIRONMENT

BACKGROUND

Digital audio workstations ("DAW") applications provide functionality for recording, editing, and producing digital audio. DAWs commonly provide application programming interfaces ("APIs") that enable the utilization of audio processing plug-ins ("plug-ins" or "audio plug-ins"), which can add or enhance the functionality of a DAW, or another type of plug-in host application. For example, a plug-in might transform digital audio, such as by applying an effect like reverb or delay to the digital audio. Other types of plug-ins can generate digital audio through sound synthesis. Plug-ins providing other types of functionality can also be utilized to transform, generate, or analyze digital audio.

Audio processing plug-ins commonly utilize sophisticated digital signal processing techniques to transform digital audio. In many cases, these techniques are computationally expensive and, as a result, utilize significant amounts of processor cycles and memory, particularly where multiple instances of the same or different plug-ins are utilized simultaneously. As a result, many computing systems are limited in the number of plug-ins that can be executed simultaneously. In addition to the significant technical limitations imposed by the execution of computationally expensive plug-ins on a musician's computing device, the inability to execute many plug-ins simultaneously can also hinder modern musicians from realizing their full creativity.

Other technical challenges also exist relating to the development and distribution of audio processing plug-ins. For example, plug-in developers commonly develop and support many different versions of the same plug-in, such as VIRTUAL STUDIO TECHNOLOGY ("VST"), AUDIO UNITS ("AU"), AAX, and RTAS. Developers might also create versions of plug-ins for different operating systems and for 32-bit and 64-bit execution. Development of multiple versions of the same plug-in in this manner can result in the inefficient utilization of developer computing resources, such as processor cycles and memory. Moreover, development of the same plug-in on multiple platforms in this manner can slow down the software development process, thereby making inefficient use of developer time.

Because audio plug-ins are executed on a musician's local computing device, it is also necessary for plug-in developers to widely distribute their plug-ins and updates to the plug-ins to individual musicians. This results in significant use of network bandwidth, particularly for plug-ins that are large and for popular plug-ins having thousands or even millions of users.

Finally, because audio processing plug-ins are often expensive and widely distributed, piracy of audio processing plug-ins has historically been significant. As a result, plug-in developers commonly include anti-piracy program code in their plug-ins. Execution of this code can utilize processor cycles and memory that could otherwise be utilized by the plug-in itself, a DAW, or another application.

It is with respect to these technical problems, and others, that the disclosure made herein is presented.

SUMMARY

Technologies are described herein for processing digital audio using audio processing plug-ins executing in a remote distributed computing environment. Through an implementation of the technologies disclosed herein, plug-ins can be executed on server computers that are remote from a musician's computing device, rather than on the musician's computing device itself. As a result, the utilization of computing resources like processor cycles and memory on a musician's computing device by plug-ins can be reduced, thereby permitting the simultaneous execution of more plug-ins, and the execution of plug-ins faster, than previously possible.

Additionally, the technologies disclosed herein can enable plug-in developers to develop only a single version of a plug-in that can be utilized by musician's computing devices having different operating systems. This can save significant developer resources, including computing resources like processor cycles and memory. Moreover, utilizing the technologies disclosed herein, plug-ins no longer need to be distributed to musicians' computing devices individually. Rather, a single version of a plug-in can be deployed to and executed in a distributed computing environment. Elimination of the wide distribution of audio plug-ins can save significant network bandwidth and reduce or eliminate the piracy of plug-ins. Other technical benefits not specifically identified herein can also be realized through implementations of the disclosed technologies.

According to one embodiment, an audio processing plug-in shim is executed on a computing device. The audio processing plug-in shim operates in conjunction with a plug-in host application, such as a DAW application, also executing on the computing device. The plug-in shim receives a stream of digital audio from the plug-in host application and transmits the digital audio to a network service executing in a remote distributed computing environment.

The network service receives the digital audio and routes the digital audio to one or more audio processing plug-ins, also executing in the distributed computing environment. The audio plug-ins process the digital audio, such as by applying digital signal processing techniques to the digital audio, and return processed audio to the network service. The network service returns the processed audio to the plug-in shim executing on the remote computing device. The plug-in shim, in turn, receives the processed audio from the network service and provides the processed audio to the plug-in host application.

In some embodiments, the plug-in shim provides a user interface ("UI") or other mechanism for receiving configuration parameters that specify the order in which audio processing plug-ins executing in the distributed computing environment are to process the digital audio. For example, and without limitation, the configuration parameters might specify that two or more audio plug-ins are to process the digital audio in series, in parallel, or in a combination of series and parallel. When the plug-in shim receives the configuration parameters, the plug-in shim transmits the configuration parameters to the network service which, in turn, configures the audio processing plug-ins to process the digital audio in the configuration specified by the configuration parameters.

The plug-in shim can also provide a UI for receiving plug-in settings that specify a configuration for the audio processing plug-ins. For example, if one of the audio processing plug-ins applies a reverb effect to the digital audio, the UI might provide an interface through which a user can specify the amount of reverb to be applied to the digital audio. As another example, if one of the audio processing plug-ins applies a delay effect to the digital audio, the UI might provide an interface through which a user can specify the amount of delay to be applied to the digital audio. The plug-in shim receives the plug-in settings through the UI and transmits the plug-in settings to the network service. The network service, in turn, configures the audio processing plug-ins using the plug-in settings.

In various embodiments disclosed herein, the plug-in shim utilizes the same APIs to interface with the plug-in host application as other plug-ins. For example, and without limitation, the plug-in shim can utilize APIs compatible with the VST, AU, AAX, and RTAS standards. As a result, the audio processing plug-in shim can be configured to process audio in series, parallel, or in a combination of series and parallel, with other audio processing plug-ins executing on the computing device. In this manner, digital audio can be processed by both plug-ins executing on a computing device and plug-ins executing in a remote distributed computing environment.

As discussed above, the network service, which might be referred to herein as an "audio processing network service," executes in a network-accessible distributed computing environment. The network service exposes a network services API for enabling the processing of digital audio by one or more audio processing plug-ins, which also execute in the distributed computing environment. The network service receives requests at the API to process digital audio using the plug-ins, such as from an audio processing plug-in shim. The requests can include the digital audio to be processed. In turn, the network service provides the digital audio to the plug-ins executing in the distributed computing environment, receives processed audio from the plug-ins, and provides the processed audio to the audio processing plug-in shim in response to the requests received at the network services API.

As also discussed above, the network service can receive configuration parameters from the audio processing plug-in shim via the network services API that specify the order in which two or more of the audio processing plug-ins are to process the digital audio. The network service then configures the audio processing plug-ins to process the digital audio in the order specified by the configuration parameters. For instance, the network service might configure the audio plug-ins to process the digital audio in series, in parallel, or in combinations of series and parallel.

The network service can also receive plug-in settings at the network services API from the audio processing plug-in shim. As discussed above, the plug-in settings specify a configuration for the audio processing plug-ins. The network service can then configure the operation of the audio processing plug-ins based upon the plug-in settings received at the network services API. For example, an audio processing plug-in might be configured to apply a certain amount of an effect, such as the amount of reverb or delay. Other aspects of the operation of the plug-ins can be configured in a similar manner.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
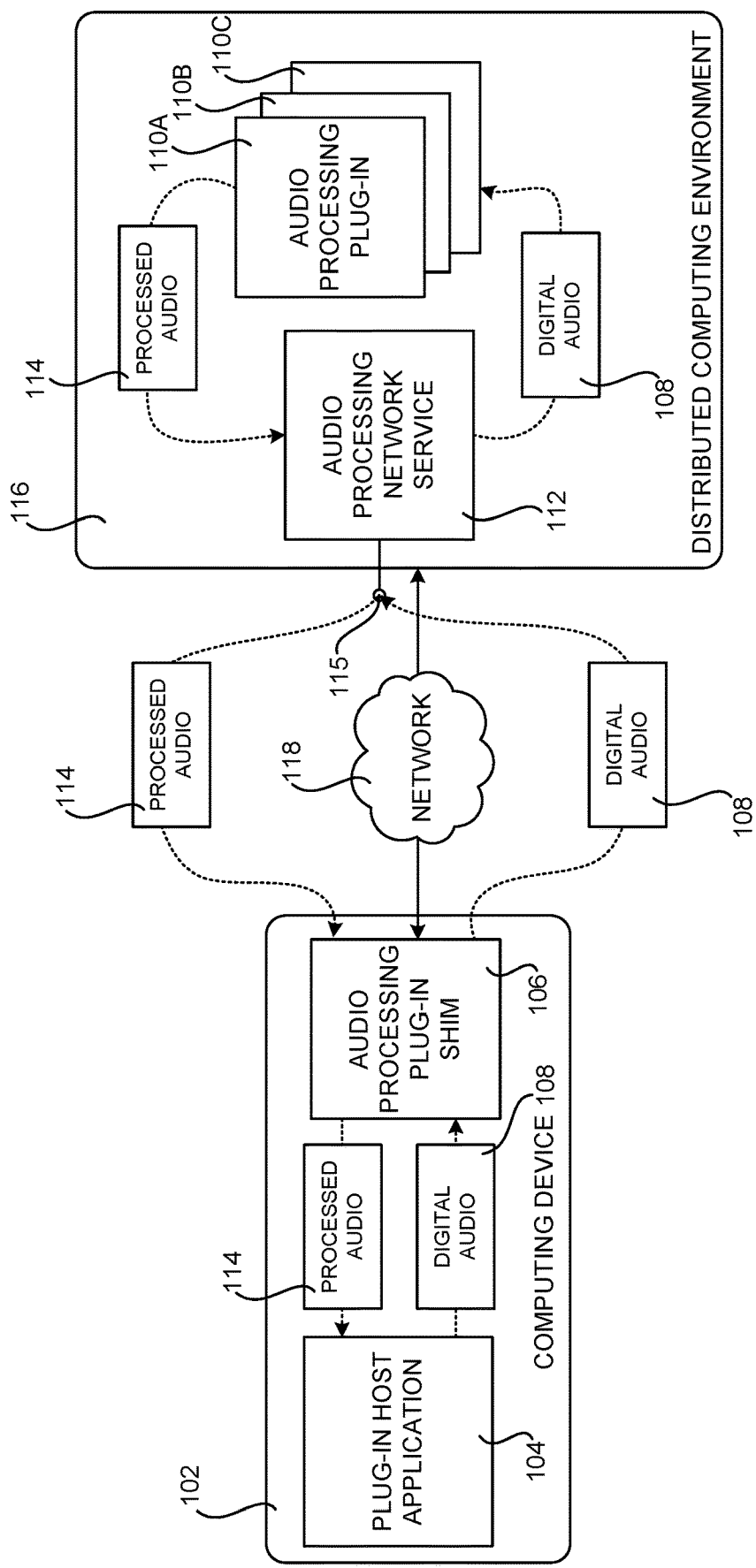
FIG. 1A is a network architecture diagram showing aspects of a system for processing digital audio using audio processing plug-ins executing in a distributed computing environment, according to one particular embodiment.

The following detailed description is directed to technologies for processing digital audio using audio processing plug-ins executing in a distributed computing environment. As discussed briefly above, implementations of the technologies disclosed herein can reduce the utilization of processor cycles, memory, network bandwidth and, potentially, other computing resources by executing audio processing plug-ins in a distributed computing environment. Other technical benefits not specifically identified herein might also be realized through an implementation of the disclosed technologies.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for executing audio processing plug-ins in a distributed computing environment will be described.

FIG. 1A is a network architecture diagram showing aspects of a system for processing digital audio 108 using audio processing plug-ins 110 executing in a distributed computing environment 116, according to one particular embodiment. As illustrated in FIG. 1A, a computing device 102, such as a desktop or laptop computer operated by a musician, executes a plug-in host application 104, such as a DAW application, in one configuration. As discussed above, a DAW application provides functionality for recording, editing, and producing digital audio 108.

DAWs, and other type of plug-in host applications 104, also provide APIs that enable the utilization of audio processing plug-ins 110 to add or enhance the functionality of the DAW. For example, a plug-in 110 might transform a stream of digital audio 108, such as by performing digital signal processing on the digital audio 108 to apply an effect like reverb or delay to the digital audio 108. Other types of plug-ins 110 can generate digital audio 108 through sound synthesis. Plug-ins 110 providing other types of functionality can also be utilized to transform, generate, or analyze digital audio 108. In this regard, it is to be appreciated that while the embodiments disclosed herein are occasionally described with reference to a DAW application, the embodiments disclosed herein can also be utilized with other types of plug-in host applications 104 (which might be referred to herein as "plug-in hosts").

Execution of audio processing plug-ins 110 on a computing device 102, such as a laptop or desktop computer, can create multiple technical problems, some of which are described above. In order to address these technical problems, the technologies disclosed herein include an audio processing plug-in shim 106 (which might be referred to herein as a "plug-in shim" or a "shim").

The plug-in shim 106 executes on the computing device 102 and operates in conjunction with a plug-in host application 104, such as a DAW application, also executing on the computing device 102. The plug-in shim 106 can utilize an API provided by the plug-in host application 104 for utilization as a standard audio processing plug-in 110. For example, the plug-in shim 106 might be implemented as a VST, AU, AAX, or RTAS -compatible plug-in. Multiple instances of the plug-in shim 106 can be utilized simultaneously.

The plug-in shim 106 receives a stream of digital audio 108 from the plug-in host application 104, and transmits the digital audio 108 to a network service 112, which might be referred to herein as the "audio processing network service." As shown in FIG. 1A, the network service 112 executes in a remote distributed computing environment 116. The computing device 102 can communicate with the network service 112 via a network 118, such as the Internet. Details regarding the configuration and operation of one illustrative distributed computing environment 116 will be provided below with regard to FIG. 5.

The network service 112 exposes a network services API 115 for enabling the processing of digital audio 108 by one or more audio processing plug-ins 110, which also execute in the distributed computing environment 116. The plug-ins 110 executing in the distributed computing environment 116 can also be audio plug-ins that are compatible with industry standard plug-in formats such as, but not limited to, VST, AU, AAX, and RTAS. In this manner, the same plug-ins developed for execution on the computing device 102 in connection with a plug-in host application 104 can also be executed in the distributed computing environment 116 with little or no modification.

The network service 112 receives requests at the API 115 to process digital audio 108 using the plug-ins 110, such as from the audio processing plug-in shim 106. When a request is made to the API 115 to process digital audio 108, the network service 112 receives the digital audio 108 and routes the digital audio 108 to one or more audio processing plug-ins, such as the plug-ins 110A-110C illustrated in FIG. 1A.

As discussed above, the audio plug-ins 110 process the digital audio 108, such as by applying digital signal processing techniques to the digital audio 108. In some embodiments, the audio plug-ins 110 executing in the distributed computing environment 116 are customized for execution on hardware optimized for real-time audio processing such as, but not limited to, DSPs, graphics processing units ("GPUs"), 64-bit processors supporting SIMD instructions, or computing systems with large amounts of memory and solid-state storage. In this manner, the audio plug-ins 110 can be executed on high-end hardware that would otherwise be inaccessible to users. This can enable greater numbers of plug-ins 110 to be executed simultaneously than possible on the computing device 102. This can also enable plug-ins to execute faster because higher-performance hardware is available in the distributed computing environment 116 than on the computing device 102.

Additionally, audio plug-in developers can distribute their plug-ins 110, and updates to their plug-ins, to the distributed computing environment 116 rather than separately to many individual users, thereby saving significant network bandwidth and other computing resources. The same plug-ins 110 executing in the distributed computing environment 116 can also be utilized by plug-in hosts 104 executing on different operating systems (e.g. WINDOWS, OSX, 32-bit, 64-bit), thereby saving developers the complex and resource consuming task of writing plug-ins 110 that are compatible with different operating systems. Limiting distribution of the plug-ins 110 to servers in the distributed computing environment 116 can also reduce piracy of the plug-ins 110.

In some configurations, the client-side plugin shim 106 compresses the digital audio 108 prior to transmitting the stream of digital audio 108 to the API 115. The compressed digital audio 108 can be decompressed prior to providing the digital audio 108 to the plug-ins 110 for processing.

Once the plug-ins 110 have processed the digital audio 108, the plug-ins 110 return processed audio 114 to the network service 112. The network service 112, in turn, returns the processed audio 114 to the plug-in shim 106 executing on the remote computing device 102. The plug-in shim 106 receives the processed audio 114 from the network service 112 and provides the processed audio 114 to the plug-in host application 104 for playback or processing in another manner.

Figure 1B:
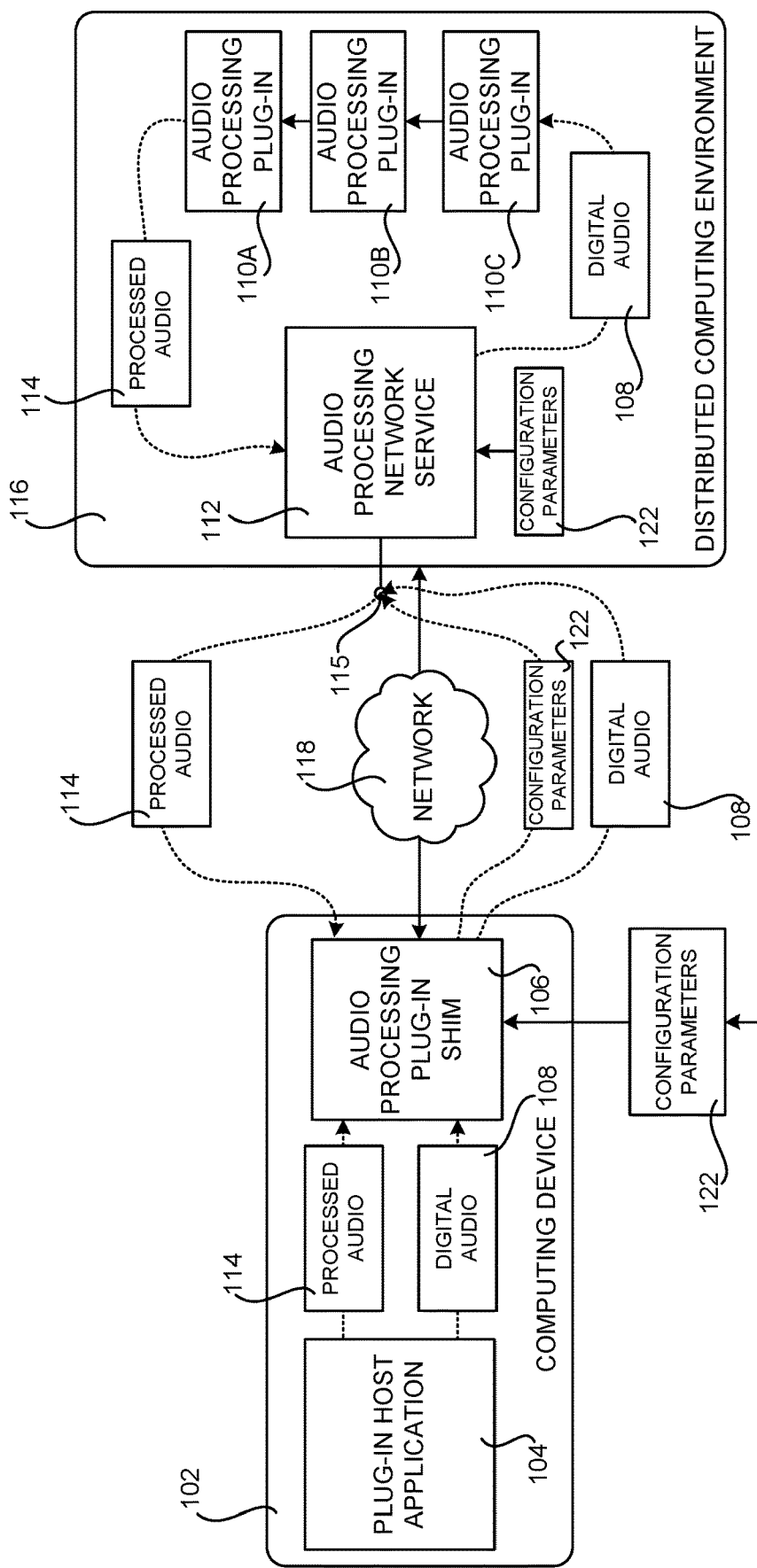
FIG. 1B is a network architecture diagram showing further aspects of the system shown in FIG. 1A for processing digital audio using audio processing plug-ins executing in a distributed computing environment, according to one particular embodiment.

As illustrated in FIG. 1B, the plug-in shim 106 can also provide a UI 120 that includes UI controls for receiving configuration parameters 122 that specify the order in which audio processing plug-ins 110 executing in the distributed computing environment 116 are to process the digital audio 108. For example, and without limitation, the configuration parameters 122 might specify that two or more audio plug-ins 110 are to process the digital audio 108 in series, in parallel, or in a combined series/parallel configuration.

When the plug-in shim 106 receives the configuration parameters 122, such as from a user of the computing device 102, the plug-in shim 106 transmits the configuration parameters 122 to the API 115 exposed by the network service 112. The network service 112, in turn, configures the audio processing plug-ins 110 to process the digital audio 108 in the configuration specified by the configuration parameters 122.

In the example shown in FIG. 1B, for instance, the audio processing plug-ins 110A-110C have been configured to process the digital audio 108 in series. The plug-in 110C processes the digital audio 108 first and passes its output to the plug-in 110B. The plug-in 110B processes the digital audio received from the plug-in 110C and passes its output to the plug-in 110A. The plug-in 110A processes the digital audio received from the plug-in 110B and passes its output, the processed audio 114, back to the network service 112.

Figure 1C:
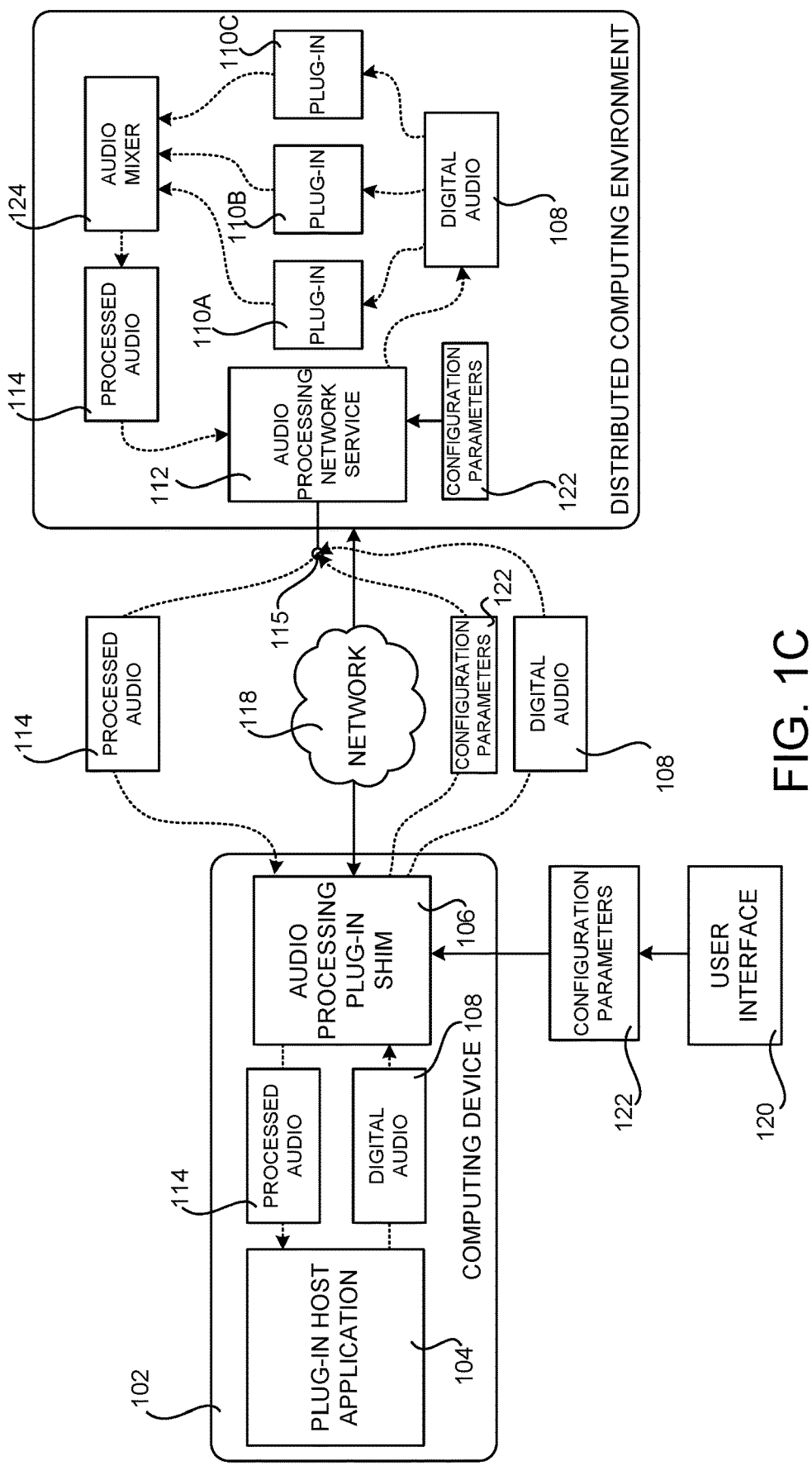
FIG. 1C is a network architecture diagram showing further aspects of the system shown in FIGS. 1A and 1B for processing digital audio using audio processing plug-ins executing in a distributed computing environment, according to one particular embodiment.

In the example shown in FIG. 1C, the audio processing plug-ins 110A-110C have been configured to process the digital audio 108 in parallel with one another. The output of the plug-ins 110A-110C is then passed to an audio mixer 124 in one implementation that passes the mixed processed audio 114 to the network service 112. In other embodiments, the individual outputs of the plug-ins 110A-110C can be passed back to the network service 112 and, ultimately, to the plug-in shim 106. In this regard, it is to be appreciated that the examples shown in FIGS. 1B and 1C are merely illustrative and that the plug-ins 110 can be configured to process the digital audio 108 in other ways, such as in a combination of series and parallel processing.

In some embodiments, a user can select a preset configuration of plug-ins 110 through UI controls provided by the UI 120, or in another manner. Users can utilize a preset configuration to process a stream of digital audio 197 in a particular manner without having to manually configure the connections between the plug-ins 110. This functionality could be useful, for instance, to enable simulation of effects chains utilized by popular producers or musicians.

In various embodiments disclosed herein, the plug-in shim 106 utilizes the same APIs to interface with the plug-in host application 104 as standard plug-ins 110. For example, and without limitation, the plug-in shim 106 can utilize APIs for interfacing with the plug-in host application 104 that are compatible with the VST, AU, AAS, or RTAS standards. As a result, the audio processing plug-in shim 106 can be configured to process digital audio 108 in combination with other audio processing plug-ins 110 executing on the computing device 102. In this manner, digital audio 108 can be processed by both plug-ins 110 executing on the computing device 102 and plug-ins 110 executing in the remote distributed computing environment 116. The plug-in host 104 can provide a UI for defining the order in which plug-ins 110 executing on a computing device 102 are to process digital audio 108.

Figure 1D:
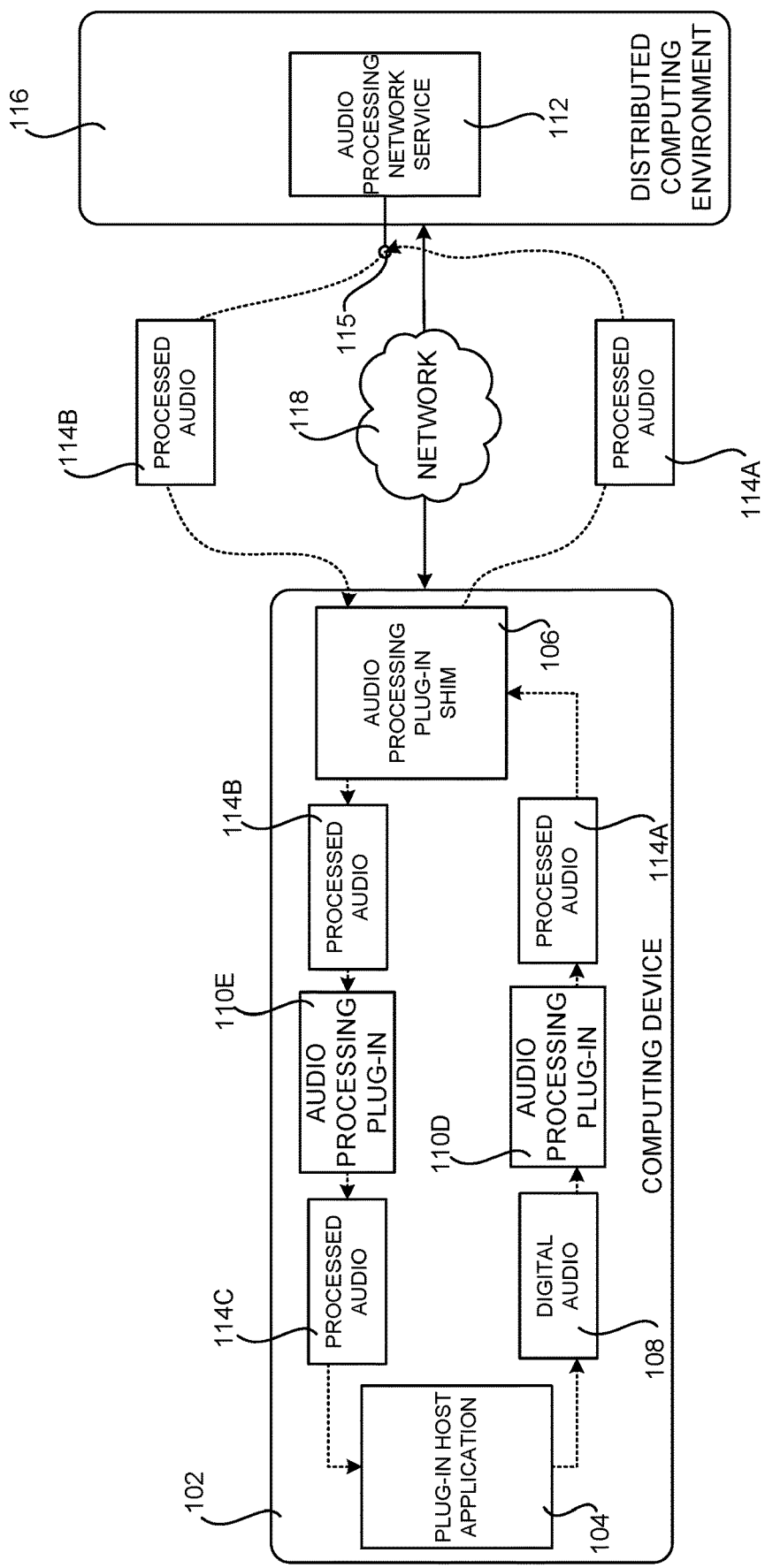
FIG. 1D is a network architecture diagram showing further aspects of the system shown in FIGS. 1A-1C for processing digital audio using audio processing plug-ins executing in a distributed computing environment, according to one particular embodiment.

In the example configuration shown in FIG. 1D, for instance, the plug-in shim 106 has been configured to utilize plug-ins 110 executing in the distributed computing environment 116 to process digital audio 108 in series with the plug-ins 110D and 110E, which are executing on the computing device 102. In this example configuration, the plug-in host 104 provides the digital audio 108 to the plug-in 110D for processing. The output of the plug-in 110D, the processed audio 114A, is passed to the plug-in shim 106. The plug-in shim 106 provides the processed audio 114A to the network service 112 for processing by plug-ins 110 executing in the distributed computing environment 116. The output of these plug-ins, the processed audio 114B, is returned to the plug-in shim 106. The plug-in shim 106 passes the processed audio 114B to the plug-in 110E for processing. The output of the plug-in 110E, the processed audio 114C, is then passed to the plug-in host 104 for playback or processing in another manner.

Figure 1E:
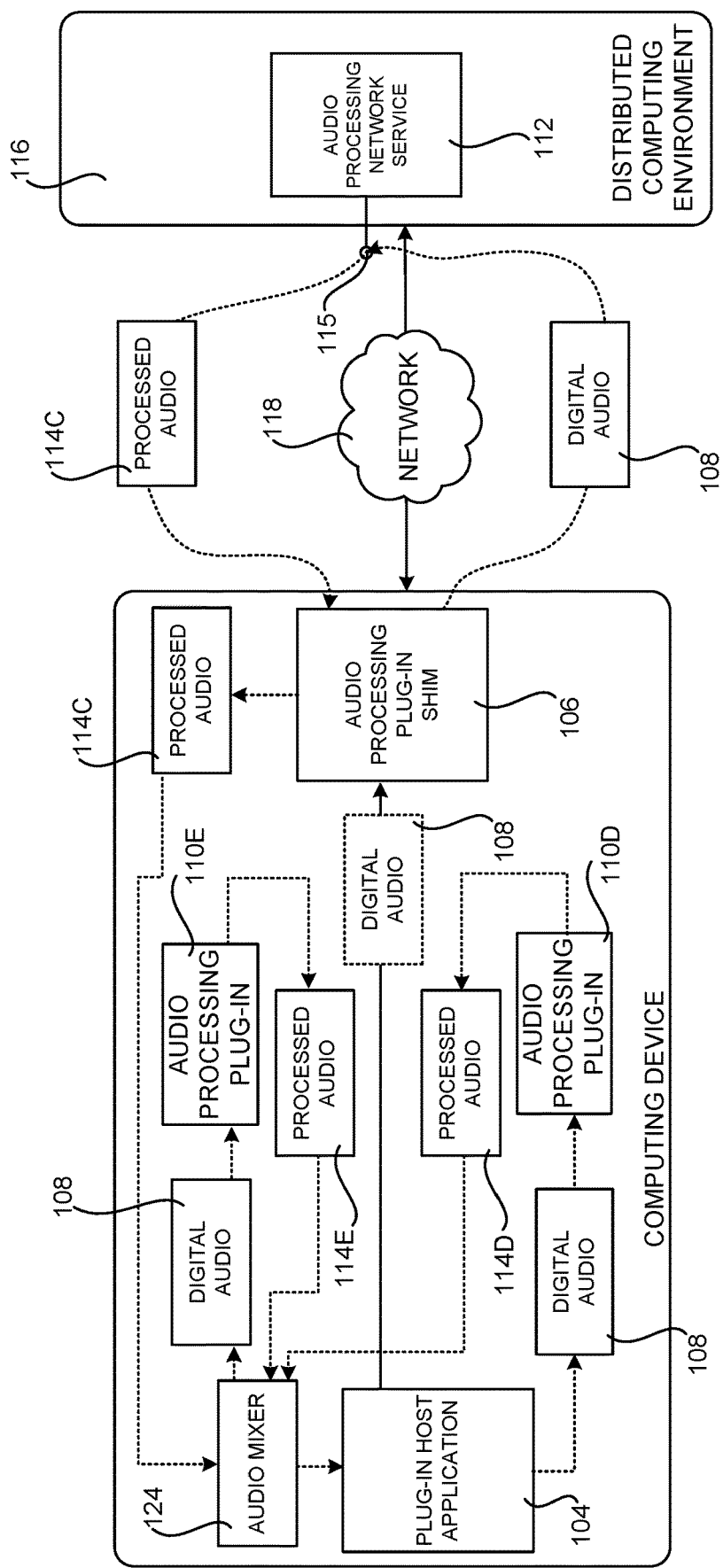
FIG. 1E is a network architecture diagram showing further aspects of the system shown in FIGS. 1A-1D for processing digital audio using audio processing plug-ins executing in a distributed computing environment, according to one particular embodiment.

In another example configuration, shown in FIG. 1E, the plug-in shim 106 has been configured to utilize plug-ins 110 executing in the distributed computing environment 116 to process digital audio 108 in parallel with the plug-ins 110D and 110E, which are executing on the computing device 102. In this example configuration, the digital audio 108 is provided to the plug-in 110D, the plug-in 110E, and the plug-in shim 106. The plug-in 110D processes the digital audio 108 and passes the processed audio 114D to an audio mixer 124. The plug-in 110E processes the digital audio 108 and passes the processed audio 114E to the audio mixer 124. The plug-in shim 106 provides the digital audio 108 to the network service 112 for processing by plug-ins 110 executing in the distributed computing environment 116 in the manner described above. The plug-in shim 106 then passes the processed audio 114C to the audio mixer 124. The audio mixer 124 provides a mixed signal containing the processed audio 114C, 114D, and 114E to the plug-in host 104. In other embodiments, the processed audio 114C, 114D, and 114E are passed to the plug-in host 104 individually.

In some configurations, the plug-ins 110 to be executed on the computing device 102 and the plug-ins 110 to be executed in the distributed computing environment 116 are automatically determined by the plug-in host 104 or the plug-in shim 106. For example, and without limitation, plug-ins 110 having significant or specialized computing resource requirements might be selected for execution in the distributed computing environment 116. Plug-ins 110 might also be selected for execution in the distributed computing environment 116 based on the capabilities of the computing device 102. For example, all of the plug-ins 110 might be executed in the distributed computing environment 116 if the computing device 102 has insufficient computing resources to execute the plug-ins 110. Other criteria can be utilized in other embodiments to identify plug-ins 110 for execution in the distributed computing environment 116.

Figure 1F:
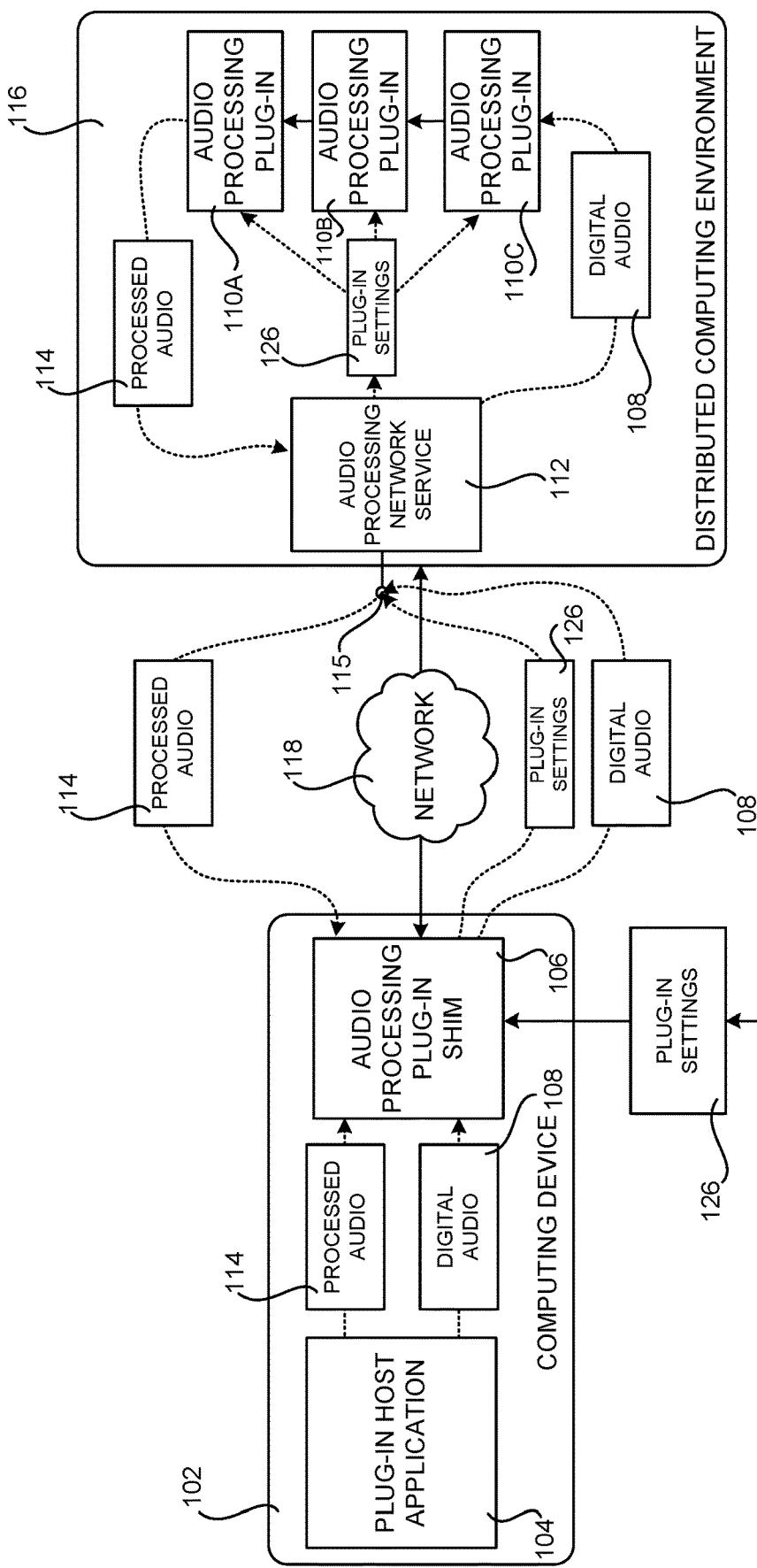
FIG. 1F is a network architecture diagram showing further aspects of the system shown in FIGS. 1A-1E for processing digital audio using audio processing plug-ins executing in a distributed computing environment, according to one particular embodiment.

As shown in FIG. 1F, the UI 120 can also include UI controls for receiving plug-in settings 126 that specify a configuration for the audio processing plug-ins 110. For example, if one of the audio processing plug-ins 110 applies a reverb effect to the digital audio 108, the UI 120 might provide UI controls through which a user can specify the amount of reverb to be applied to the digital audio 108. As another example, if one of the audio processing plug-ins 110 applies a delay effect to the digital audio 108, the UI 120 might provide UI controls through which a user can specify the amount of delay to be applied to the digital audio 108.

The plug-in shim 106 receives the plug-in settings 126 through the UI 120 and transmits the plug-in settings 126 to the network service 112. For example, the API 115 can be configured to receive the plug-in settings 126 in some configurations. The network service 112, in turn, configures the audio processing plug-ins 110 in the manner set forth by the plug-in settings 126.

Figure 2:
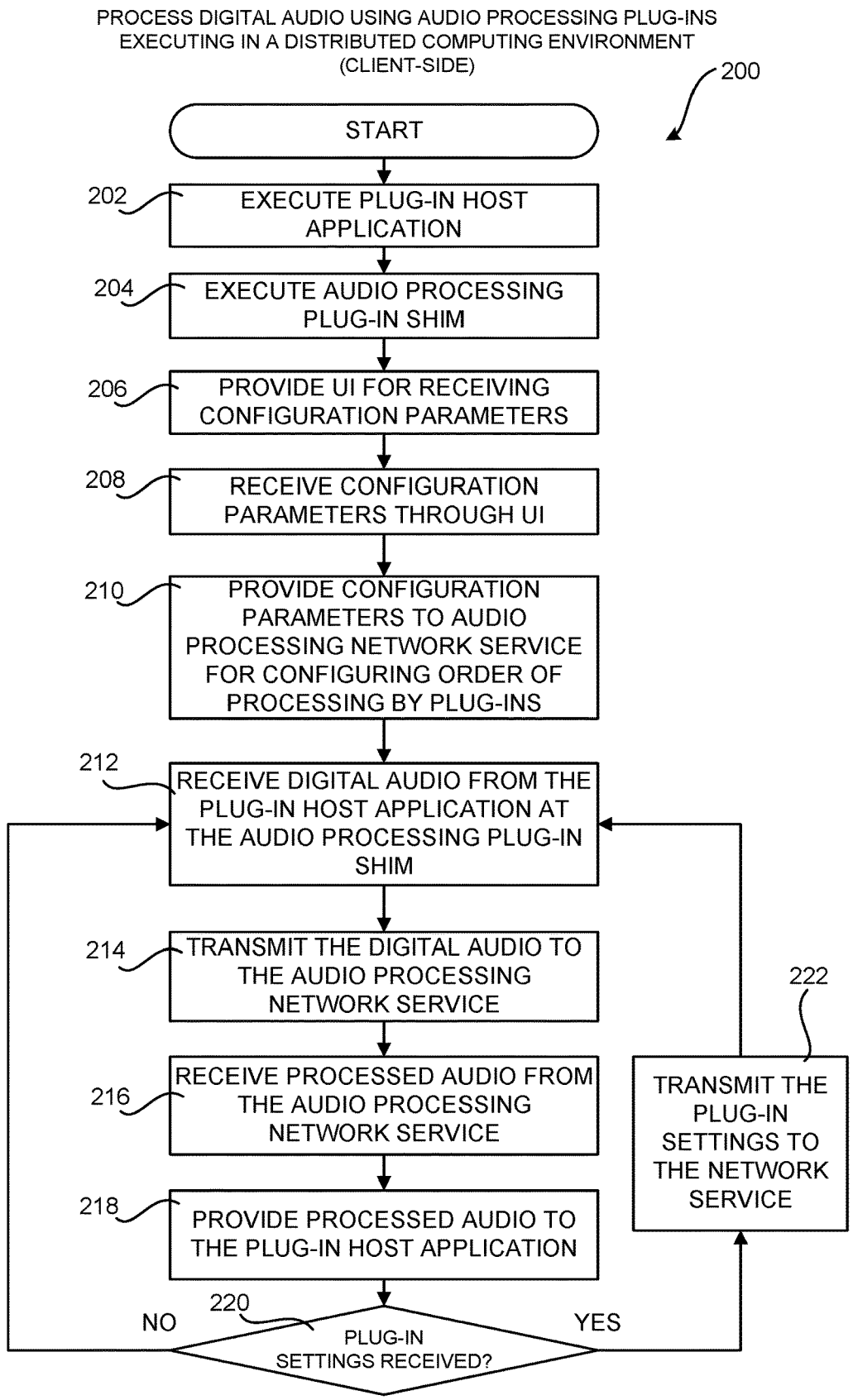
FIG. 2 is a flow diagram showing a routine that illustrates aspects of the operation of the computing devices shown in FIGS. 1A-1F for processing digital audio using audio processing plug-ins executing in a distributed computing environment, according to one embodiment disclosed herein.

FIG. 2 is a flow diagram showing a routine 200 that illustrates aspects of the operation of the computing device 102 shown in FIGS. 1A-1F for processing digital audio 108 using audio processing plug-ins 110 executing in a distributed computing environment 116, according to one embodiment disclosed herein. It should be appreciated that the logical operations described herein with regard to FIG. 3, and the other FIGS., can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 200 begins at operation 202, where the computing device 102 executes the plug-in host application 104. As discussed above, the plug-in host application 104 is a DAW in some embodiments.

From operation 202, the routine 200 proceeds to operation 204, where the computing device 102 executes the audio processing plug-in shim 106. At operation 206, the plug-in shim 106 provides the UI 120 for receiving configuration parameters 122. The plug-in shim 106 receives the configuration parameters 122 at operation 208.

From operation 208, the routine 200 proceeds to operation 210, where the plug-in shim 106 provides the configuration parameters 122 to the network service 112 via the API 115. As discussed above, the network service 122 can utilize the configuration parameters to configure the order in which the plug-ins 110 will process the digital audio 108.

From operation 210, the routine 200 proceeds to operation 212, where the plug-in shim 106 receives a stream of digital audio 108 from the plug-in host application 104. The plug-in shim 106 then transmits the digital audio 108 to the audio processing network service 112 at operation 214. The network service 112 causes the plug-ins 110 to process the digital audio 108 in the manner described above and passes the processed audio 114 back to the plug-in shim 106.

The plug-in shim 106 receives the processed audio 114 from the network service 112 at operation 216. The plug-in shim 106 then provides the processed audio 114 to the plug-in host application 104 at operation 218.

At operation 220, the plug-in shim 106 determines whether plug-in settings 126 have been received, such as through the UI 120. If plug-in settings 126 have not been received, the routine 200 proceeds back to operation 212, where the operations described above can be repeated. If the plug-in shim 106 has received plug-in settings 126, the routine 200 proceeds from operation 220 to operation 222, where the plug-in shim 106 transmits the plug-in settings 126 to the API 115 exposed by the network service 112. As discussed above, the network service 112 utilizes the plug-in settings 126 to configure the operation of one or more of the plug-ins 110. The routine 200 then proceeds from operation 222 back to operation 212, where the operations described above can be repeated.

Figure 3:
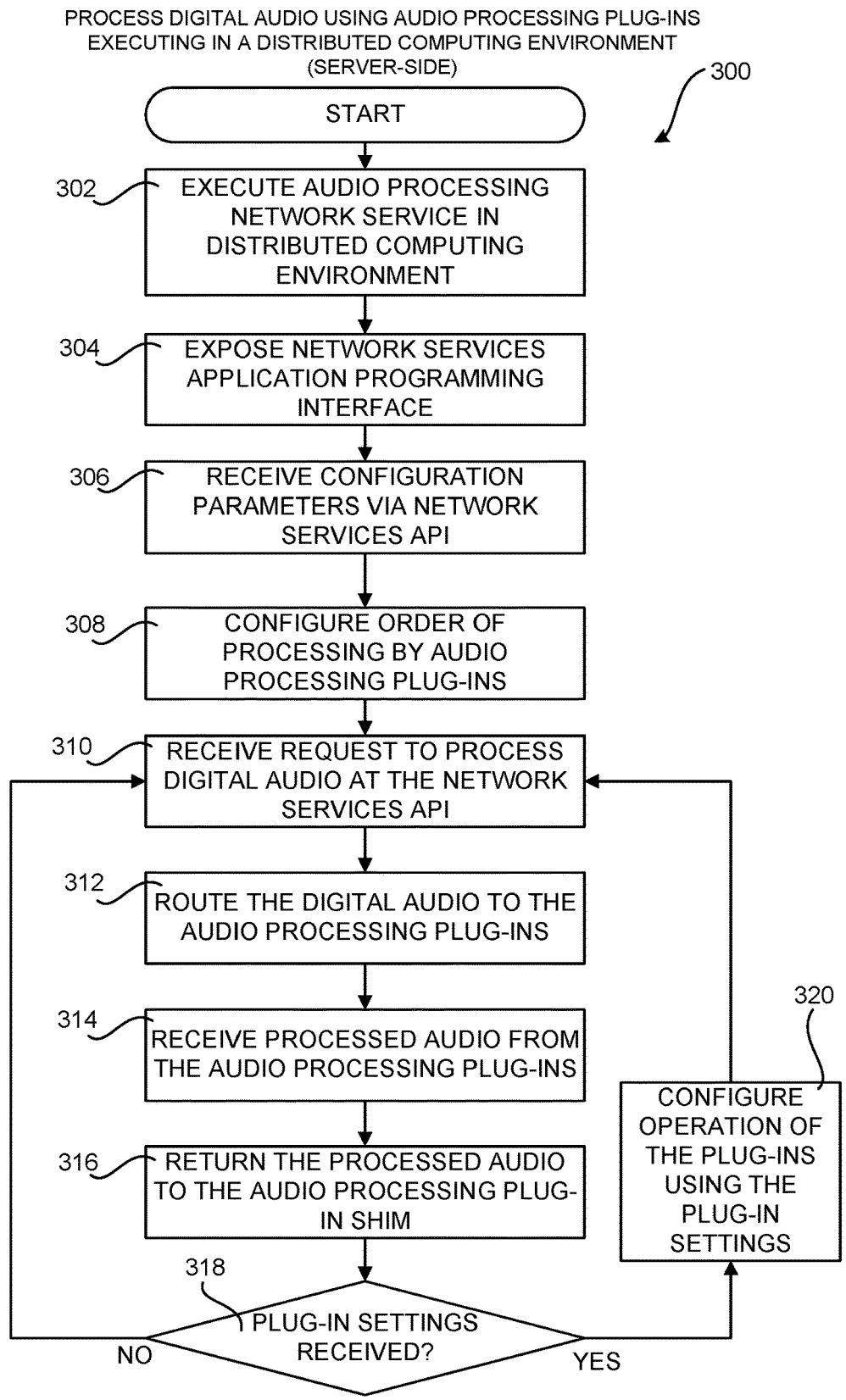
FIG. 3 is a flow diagram showing a routine that illustrates aspects of the operation of the computing devices shown in FIGS. 1A-1F for processing digital audio using audio processing plug-ins executing in a distributed computing environment, according to one embodiment disclosed herein.

FIG. 3 is a flow diagram showing a routine 300 that illustrates aspects of the operation of the network service 112 shown in FIGS. 1A-1F for processing digital audio 108 using audio processing plug-ins 110 executing in a distributed computing environment 116, according to one embodiment disclosed herein. The routine 300 begins at operation 302, where the audio processing network service 112 is executed in the distributed computing environment 302. The routine 300 then proceeds to operation 304, where the network service 112 exposes a network services API 115. Configuration parameters 122 are received from the plug-in shim 106 at operation 306.

From operation 306, the routing 300 proceeds to operation 308, where the network service 112 configures the plug-ins 110 for processing digital audio 108 in the order defined by the configuration parameters 122. The routine 300 then proceeds to operation 310, where the network services API 115 receives a request from the plug-in shim 106 to process digital audio 106. The network service 112 then routes the digital audio 108 received with the request to the plug-ins 110. The plug-ins 110 then perform their processing of the digital audio 108 to create the processed audio 114.

The network service 112 receives the processed audio 114 from the plug-ins 110 at operation 314. In turn, the network service 112 returns the processed audio 114 to the plug-in shim 106 responsive to the request submitted to the API 115 at operation 316.

From operation 316, the routine 300 proceeds to operation 318, where the network service 112 determines whether plug-in settings 126 have been received from the plug-in shim 106 by way of the API 115. If plug-in settings 126 have not been received, the routine 300 proceeds to operation 310, described above. If plug-in settings 126 have been received, the routine 300 proceeds to operation 320, where the network service 112 provides the configuration settings 126 to the plug-ins 110 in order to configure aspects of their operation, such as the amount of an effect to be applied to the digital audio 108. From operation 320, the routine 300 proceeds back to operation 310, described above, where the stream of digital audio 108 can be continually processed in the manner described above.

Figure 4:
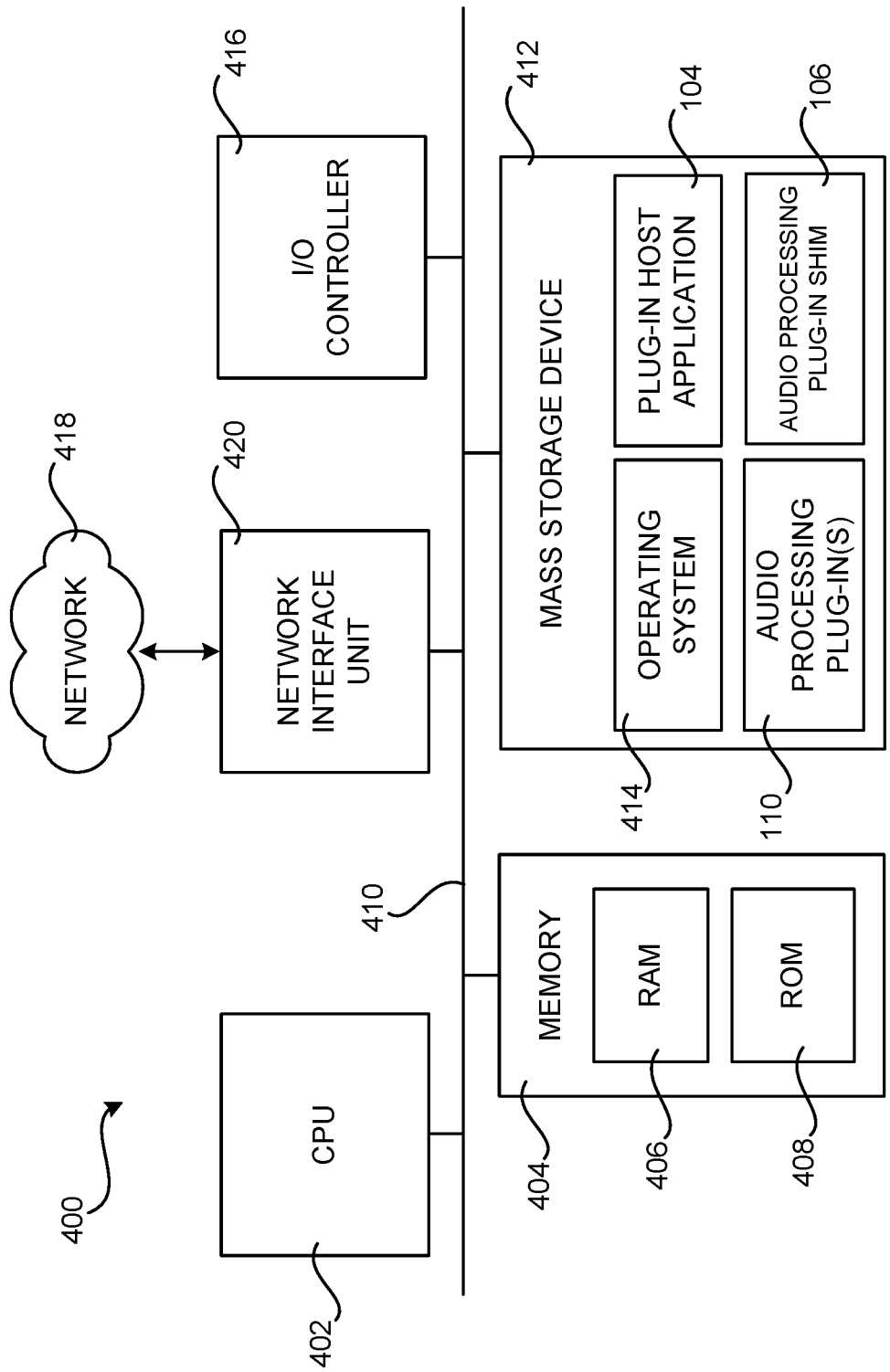
FIG. 4 is a computer architecture diagram showing an illustrative computer hardware and software architecture for a computing device, such as the computing devices shown in FIGS. 1A-1F, that is capable of implementing aspects of the technologies presented herein.

FIG. 4 is a computer architecture diagram that shows an architecture for a computer 400 capable of executing the software components described herein. The architecture illustrated in FIG. 4 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 400 shown in FIG. 4 can be utilized to implement a computing device capable of executing any of the software components presented herein. For example, and without limitation, the computing architecture described with reference to FIG. 4 can be utilized to implement the computing device 102, illustrated in FIGS. 1A-1F and described above, which can execute the audio processing plug-ins 110, the plug-in host application 104, the audio processing plug-in shim 106, and/or any of the other software components described above. The computing architecture shown in FIG. 4 can also be utilized to implement computing systems in the distributed computing environment 116 for implementing the network service 112 and for executing the audio processing plug-ins 110.

The computer 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, is stored in the ROM 408. The computer 400 further includes a mass storage device 412 for storing an operating system 414 and one or more programs including, but not limited to, the audio processing plug-ins 110, the plug-in host application 104, and the audio processing plug-in shim 106. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 418. The computer 400 can connect to the network 418 through a network interface unit 420 connected to the bus 410. It should be appreciated that the network interface unit 420 can also be utilized to connect to other types of networks and remote computer systems. The computer 400 can also include an input/output controller 416 for receiving and processing input from a number of other devices, including a keyboard, mouse, touch input, or electronic stylus (not shown in FIG. 4). Similarly, the input/output controller 416 can provide output to a display screen or other type of output device (also not shown in FIG. 4).

It should be appreciated that the software components described herein, such as the audio processing plug-ins 110, the plug-in host application 104, the audio processing plug-in shim 106, and the network service 112, when loaded into the CPU 402 and executed, can transform the CPU 402 and the overall computer 400 from a general-purpose computing system into a special-purpose computing system customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, embedded computer systems, mobile devices such as smartphones and tablets, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
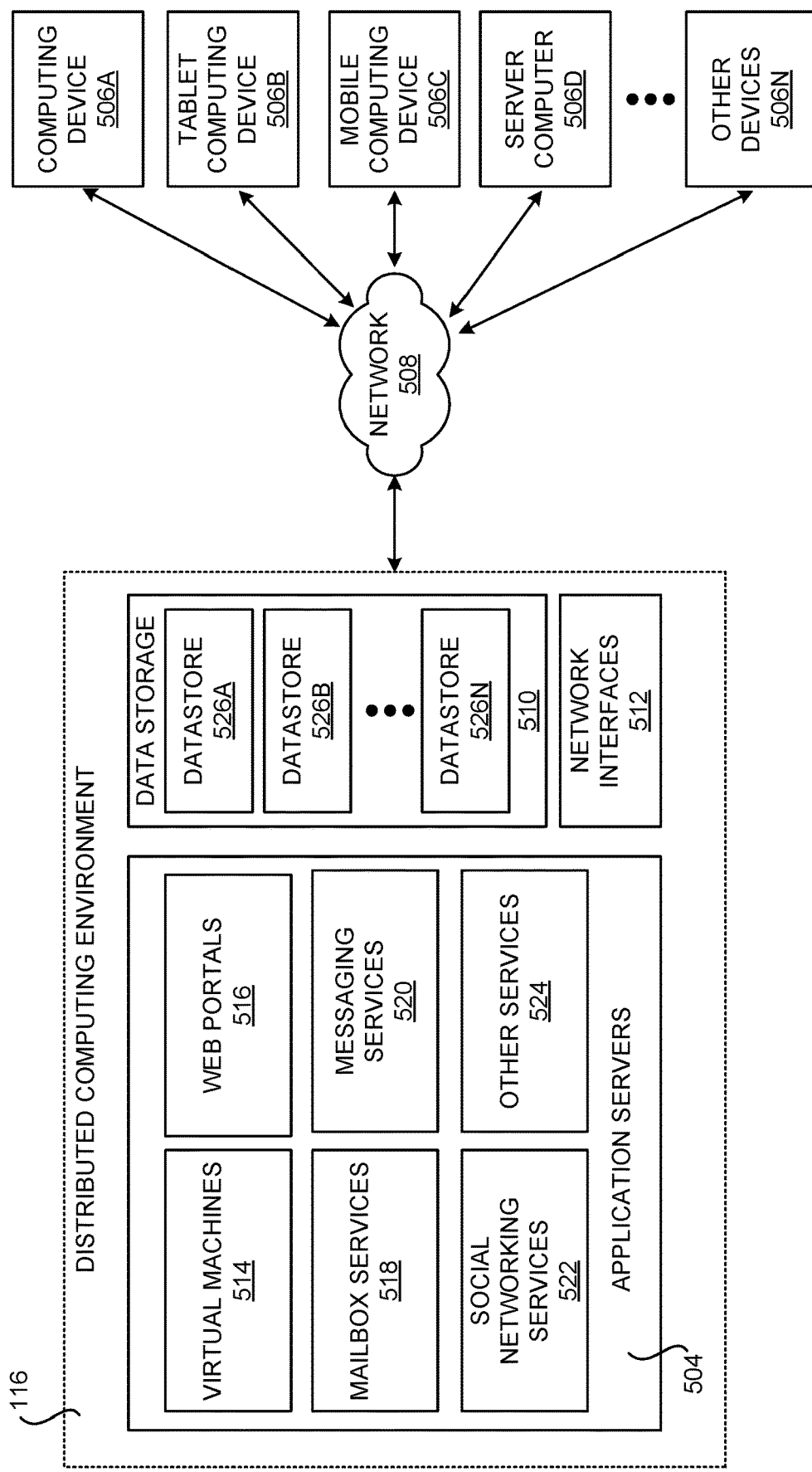
FIG. 5 is a network diagram illustrating a distributed computing environment capable of implementing aspects of the technologies presented herein.

FIG. 5 shows aspects of an illustrative distributed computing environment 116 in which the software components described herein can be executed. Thus, the distributed computing environment 116 illustrated in FIG. 5 can be used to execute program code, such as the audio processing plug-ins 110 and the network service 112, capable of providing the functionality described above with respect to FIGS. 1A-1F, and/or any of the other software components described herein.

According to various implementations, the distributed computing environment 116 operates on, in communication with, or as part of a network 508. One or more client devices 506A-506N (hereinafter referred to collectively and/or generically as "devices 506") can communicate with the distributed computing environment 116 via the network 508 and/or other connections (not illustrated in FIG. 5).

In the illustrated configuration, the devices 506 include: a computing device 506A such as a laptop computer, a desktop computer, or other computing device; a "slate" or tablet computing device ("tablet computing device") 506B; a mobile computing device 506C such as a mobile telephone, a smartphone, or other mobile computing device; a server computer 506D; and/or other devices 506N. It should be understood that any number of devices 506 can communicate with the distributed computing environment 116. Two example computing architectures for the devices 506 are illustrated and described herein with reference to FIGS. 4 and 6. It should be understood that the illustrated clients 506 and computing architectures illustrated and described herein are illustrative, and should not be construed as being limited in any way.

In the illustrated configuration, the distributed computing environment 116 includes application servers 504, data storage 510, and one or more network interfaces 512. According to various implementations, the functionality of the application servers 504 can be provided by one or more server computers that are executing as part of, or in communication with, the network 508. The application servers 504 can host various services such as virtual machines, portals, and/or other resources. In the illustrated configuration, the application servers 504 host one or more virtual machines 514 for hosting applications, such as program components for implementing the audio processing plug-ins 110 and the network service 112, or other functionality. It should be understood that this configuration is illustrative, and should not be construed as being limiting in any way. The application servers 504 might also host or provide access to one or more web portals, link pages, websites, and/or other information ("web portals") 516.

According to various implementations, the application servers 504 also include one or more mailbox services 518 and one or more messaging services 520. The mailbox services 518 can include electronic mail ("email") services. The mailbox services 518 can also include various personal information management ("PIM") services including, but not limited to, calendar services, contact management services, collaboration services, and/or other services. The messaging services 520 can include, but are not limited to, instant messaging ("IM") services, chat services, forum services, and/or other communication services.

The application servers 504 can also include one or more social networking services 522. The social networking services 522 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 522 are provided by or include the FACEBOOK social networking service, the LINKEDIN professional networking service, the FOURSQUARE geographic networking service, and the like. In other configurations, the social networking services 522 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 522 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 522 are not mentioned herein for the sake of brevity. As such, the configurations described above are illustrative, and should not be construed as being limited in any way.

As also shown in FIG. 5, the application servers 504 can also host other services, applications, portals, and/or other resources ("other services") 524. These services can include, but are not limited to, streaming video services like the NETFLIX streaming video service and productivity services such as the GMAIL email service from GOOGLE INC. It thus can be appreciated that activities performed by users of the distributed computing environment 116 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 116 can include data storage 510. According to various implementations, the functionality of the data storage 510 is provided by one or more databases operating on, or in communication with, the network 508. The functionality of the data storage 510 can also be provided by one or more server computers configured to host data for the distributed computing environment 116. The data storage 510 can include, host, or provide one or more real or virtual datastores 526A-526N (hereinafter referred to collectively and/or or generically as "datastores 526"). The datastores 526 are configured to host data used or created by the application servers 504 and/or other data.

The distributed computing environment 116 can communicate with, or be accessed by, the network interfaces 512. The network interfaces 512 can include various types of network hardware and software for supporting communications between two or more computing devices including, but not limited to, the devices 506 and the application servers 504. It should be appreciated that the network interfaces 512 can also be utilized to connect to other types of networks and/or computer systems.

It should be understood that the distributed computing environment 116 described herein can implement any aspects of the software elements described herein with any number of virtual computing resources and/or other distributed computing functionality that can be configured to execute any aspects of the software components disclosed herein. It should also be understood that the devices 506 can also include real or virtual machines including, but not limited to, server computers, web servers, personal computers, mobile computing devices, smartphones, and/or other devices. As such, various implementations of the technologies disclosed herein enable any device configured to access the distributed computing environment 116 to utilize the functionality described herein.

Figure 6:
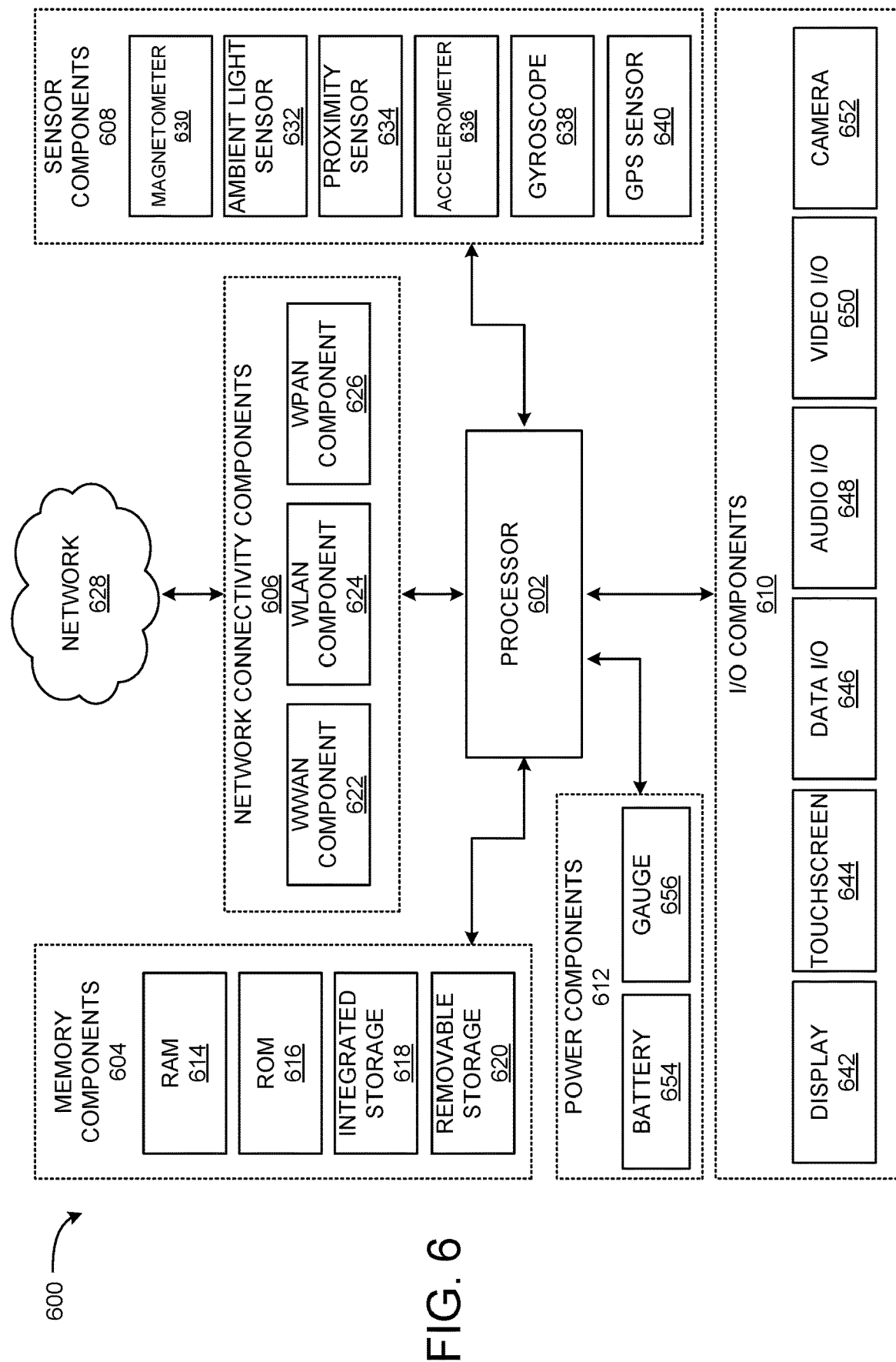
FIG. 6 is a computer architecture diagram illustrating a computing device architecture for a computing device, such as the computing devices shown in FIGS. 1A-1C, that is capable of implementing aspects of the technologies presented herein.

Turning now to FIG. 6, an illustrative computing device architecture 600 will be described for a computing device, such as the computing device 102, that is capable of executing the various software components described herein. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 600 is also applicable to any of the devices 506 shown in FIG. 5. Furthermore, aspects of the computing device architecture 600 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, or tablet computer devices that utilize a touchscreen or some other touch-enabled device, such as a touch-enabled track pad or touch-enabled mouse. The computing device architecture 600 can also be utilized to implement the computing device 102, and/or other types of computing devices for implementing or consuming the functionality described herein.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individual components illustrated in FIG. 6, the components can be connected electrically in order to interact and carry out device functions. In some configurations, the components are arranged so as to communicate via one or more busses (not shown).

The processor 602 includes one or more CPU cores configured to process data, execute computer-executable instructions of one or more application programs and to communicate with other components of the computing device architecture 600 in order to perform various functionality described herein. The processor 602 can be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 602 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 602 is, or is included in, a system-on-chip ("SoC") along with one or more of the other components described herein below. For example, the SoC can include the processor 602, a GPU, one or more of the network connectivity components 606, and one or more of the sensor components 608. In some configurations, the processor 602 is fabricated, in part, utilizing a package-on-package ("PoP") integrated circuit packaging technique. Moreover, the processor 602 can be a single core or multi-core processor.

The processor 602 can be created in accordance with an ARM architecture, available for license from ARM HOLDINGS of Cambridge, United Kingdom. Alternatively, the processor 602 can be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a RAM 614, a ROM 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 can be soldered or otherwise connected to a logic board upon which the processor 602 and other components described herein might also be connected. As such, the integrated storage 618 is integrated in the computing device. The integrated storage 618 can be configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which can be a WWAN, a WLAN, or a WPAN. Although a single network 628 is illustrated, the network connectivity components 606 can facilitate simultaneous communication with multiple networks. For example, the network connectivity components 606 can facilitate simultaneous communications with multiple networks via one or more of a WWAN, a WLAN, or a WPAN.

The network 628 can be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 628 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 can be configured to provide voice and/or data communications with any combination of the above technologies. The network 628 can be configured or adapted to provide voice and/or data communications in accordance with future generation technologies.

In some configurations, the WWAN component 622 is configured to provide dual-multi-mode connectivity to the network 628. For example, the WWAN component 622 can be configured to provide connectivity to the network 628, wherein the network 628 provides service via GSM and UMTS technologies, or via some other combination of technologies. Alternatively, multiple WWAN components 622 can be utilized to perform such functionality, and/or provide additional functionality to support other non-compatible technologies (i.e., incapable of being supported by a single WWAN component). The WWAN component 622 can facilitate similar connectivity to multiple networks (e.g., a UMTS network and an LTE network).

The network 628 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 628 via the WI-FI access points. Such connections can be secured via various encryption technologies including, but not limited, WI-FI Protected Access ("WPA"), WPA2, Wired Equivalent Privacy ("WEP"), and the like.

The network 628 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, might also be incorporated in the computing device architecture 600.

The magnetometer 630 is configured to measure the strength and direction of a magnetic field. In some configurations, the magnetometer 630 provides measurements to a compass application program stored within one of the memory components 604 in order to provide a user with accurate directions in a frame of reference including the cardinal directions, north, south, east, and west. Similar measurements can be provided to a navigation application program that includes a compass component. Other uses of measurements obtained by the magnetometer 630 are contemplated.

The ambient light sensor 632 is configured to measure ambient light. In some configurations, the ambient light sensor 632 provides measurements to an application program stored within one the memory components 604 in order to automatically adjust the brightness of a display (described below) to compensate for low light and bright light environments. Other uses of measurements obtained by the ambient light sensor 632 are contemplated.

The proximity sensor 634 is configured to detect the presence of an object or thing in proximity to the computing device without direct contact. In some configurations, the proximity sensor 634 detects the presence of a user's body (e.g., the user's face) and provides this information to an application program stored within one of the memory components 604 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some configurations, output from the accelerometer 636 is used by an application program as an input mechanism to control some functionality of the application program. In some configurations, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some configurations, output from the gyroscope 638 is used by an application program as an input mechanism to control some functionality of the application program. For example, the gyroscope 638 can be used for accurate recognition of movement within a 3D environment of a video game application or some other application. In some configurations, an application program utilizes output from the gyroscope 638 and the accelerometer 636 to enhance user input operations. Other uses of the gyroscope 638 are contemplated.

The GPS sensor 640 is configured to receive signals from GPS satellites for use in calculating a location. The location calculated by the GPS sensor 640 can be used by any application program that requires or benefits from location information. For example, the location calculated by the GPS sensor 640 can be used with a navigation application program to provide directions from the location to a destination or directions from the destination to the location. Moreover, the GPS sensor 640 can be used to provide location information to an external location-based service, such as E911 service. The GPS sensor 640 can obtain location information generated via WI-FI, WIMAX, and/or cellular triangulation techniques utilizing one or more of the network connectivity components 606 to aid the GPS sensor 640 in obtaining a location fix. The GPS sensor 640 can also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some configurations, the display 642 and the touchscreen 644 are combined. In some configurations two or more of the data I/O component 646, the audio I/O component 648, and the video I/O component 650 are combined. The I/O components 610 can include discrete processors configured to support the various interfaces described below, or might include processing functionality built-in to the processor 602.

The display 642 is an output device configured to present information in a visual form. In particular, the display 642 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 642 is a liquid crystal display ("LCD") utilizing any active or passive matrix technology and any backlighting technology (if used). In some configurations, the display 642 is an organic light emitting diode ("OLED") display. Other display types are contemplated.

The touchscreen 644 is an input device configured to detect the presence and location of a touch. The touchscreen 644 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 644 is incorporated on top of the display 642 as a transparent layer to enable a user to use one or more touches to interact with objects or other information presented on the display 642. In other configurations, the touchscreen 644 is a touch pad incorporated on a surface of the computing device that does not include the display 642. For example, the computing device can have a touchscreen incorporated on top of the display 642 and a touch pad on a surface opposite the display 642.

In some configurations, the touchscreen 644 is a single-touch touchscreen. In other configurations, the touchscreen 644 is a multi-touch touchscreen. In some configurations, the touchscreen 644 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 644. As such, a developer can create gestures that are specific to a particular application program.

In some configurations, the touchscreen 644 supports a tap gesture in which a user taps the touchscreen 644 once on an item presented on the display 642. The tap gesture can be used for various reasons including, but not limited to, opening or launching whatever the user taps, such as a graphical icon. In some configurations, the touchscreen 644 supports a double tap gesture in which a user taps the touchscreen 644 twice on an item presented on the display 642. The double tap gesture can be used for various reasons including, but not limited to, zooming in or zooming out in stages. In some configurations, the touchscreen 644 supports a tap and hold gesture in which a user taps the touchscreen 644 and maintains contact for at least a pre-defined time. The tap and hold gesture can be used for various reasons including, but not limited to, opening a context-specific menu.

In some configurations, the touchscreen 644 supports a pan gesture in which a user places a finger on the touchscreen 644 and maintains contact with the touchscreen 644 while moving the finger on the touchscreen 644. The pan gesture can be used for various reasons including, but not limited to, moving through screens, images, or menus at a controlled rate. Multiple finger pan gestures are also contemplated. In some configurations, the touchscreen 644 supports a flick gesture in which a user swipes a finger in the direction the user wants the screen to move. The flick gesture can be used for various reasons including, but not limited to, scrolling horizontally or vertically through menus or pages. In some configurations, the touchscreen 644 supports a pinch and stretch gesture in which a user makes a pinching motion with two fingers (e.g., thumb and forefinger) on the touchscreen 644 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 644. As such, the above gestures should be understood as being illustrative and should not be construed as being limiting in any way.

The data I/O interface component 646 is configured to facilitate input of data to the computing device and output of data from the computing device. In some configurations, the data I/O interface component 646 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 648 is configured to provide audio input and/or output capabilities to the computing device. In some configurations, the audio I/O interface component 648 includes a microphone configured to collect audio signals. In some configurations, the audio I/O interface component 648 includes a headphone jack configured to provide connectivity for headphones or other external speakers. In some configurations, the audio interface component 648 includes a speaker for the output of audio signals. In some configurations, the audio I/O interface component 648 includes an optical audio cable out.

The video I/O interface component 650 is configured to provide video input and/or output capabilities to the computing device. In some configurations, the video I/O interface component 650 includes a video connector configured to receive video as input from another device (e.g., a video media player such as a DVD or BLU-RAY player) or send video as output to another device (e.g., a monitor, a television, or some other external display). In some configurations, the video I/O interface component 650 includes a High-Definition Multimedia Interface ("HDMI"), mini-HDMI, micro-HDMI, DisplayPort, or proprietary connector to input/output video content. In some configurations, the video I/O interface component 650 or portions thereof is combined with the audio I/O interface component 648 or portions thereof The camera 652 can be configured to capture still images and/or video. The camera 652 can utilize a charge coupled device ("CCD") or a complementary metal oxide semiconductor ("CMOS") image sensor to capture images. In some configurations, the camera 652 includes a flash to aid in taking pictures in low-light environments. Settings for the camera 652 can be implemented as hardware or software buttons.

Although not illustrated, one or more hardware buttons can also be included in the computing device architecture 600. The hardware buttons can be used for controlling some operational aspect of the computing device. The hardware buttons can be dedicated buttons or multi-use buttons. The hardware buttons can be mechanical or sensor-based.

The illustrated power components 612 include one or more batteries 654, which can be connected to a battery gauge 656. The batteries 654 can be rechargeable or disposable. Rechargeable battery types include, but are not limited to, lithium polymer, lithium ion, nickel cadmium, and nickel metal hydride. Each of the batteries 654 can be made of one or more cells.

The battery gauge 656 can be configured to measure battery parameters such as current, voltage, and temperature. In some configurations, the battery gauge 656 is configured to measure the effect of a battery's discharge rate, temperature, age and other factors to predict remaining life within a certain percentage of error. In some configurations, the battery gauge 656 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 612 can also include a power connector (not shown), which can be combined with one or more of the aforementioned I/O components 610. The power components 612 can interface with an external power system or charging equipment via a power I/O component 610. Other configurations can also be utilized.

The disclosure presented herein also encompasses the subject matter set forth in the following clauses:

Clause 1. A computer-implemented method, comprising: executing a network service in a distributed computing environment, the network service configured to expose a network services application programming interface (API) for processing digital audio using one or more audio processing plug-ins executing in the distributed computing environment; receiving a request from an audio processing plug-in shim at the API to process the digital audio using the one or more audio processing plug-ins executing in the distributed computing environment; and responsive to receiving the request at the API, providing the digital audio to the one or more audio processing plug-ins executing in the distributed computing environment, receiving processed audio from the one or more audio processing plug-ins, and providing the processed audio to the audio processing plug-in shim in response to the request received at the network services API.

Clause 2. The computer-implemented method of clause 1, further comprising: receiving configuration parameters at the network services API from the audio processing plug-in shim, the configuration parameters specifying an order in which two or more of the audio processing plug-ins are to process the digital audio; and configuring the two or more audio processing plug-ins to process the digital audio in the order specified by the configuration parameters received at the network services API.

Clause 3. The computer-implemented method of clause 1 or 2, wherein the configuration parameters specify that the two or more audio processing plug-ins are to process the digital data in parallel.

Clause 4. The computer-implemented method of any of clauses 1-3, wherein the configuration parameters specify that the two or more audio processing plug-ins are to process the digital data in series.

Clause 5. The computer-implemented method of any of clauses 1-4, further comprising: receiving plug-in settings at the network services API from the audio processing plug-in shim, the plug-in settings specifying a configuration for the one or more audio processing plug-ins; and configuring operation of the one or more audio processing plug-ins based upon the plug-in settings received at the network services API.

Clause 6. The computer-implemented method of any of clauses 1-5, wherein the audio processing plug-in shim operates in series with one or more other audio processing plug-ins executing on the computing device.

Clause 7. The computer-implemented method of any of clauses 1-6, wherein the audio processing plug-in shim operates in parallel with one or more other audio processing plug-ins executing on the computing device.

Clause 8. A computer-implemented method, comprising: executing, on a computing device, an audio processing plug-in shim configured for operation with a plug-in host application executing on the computing device; receiving digital audio from the plug-in host application at the audio processing plug-in shim; transmitting the digital audio from the audio processing plug-in shim to a network service executing in a distributed computing environment, the network service configured to cause one or more audio processing plug-ins executing in the distributed computing environment to process the digital audio to generate processed audio; receiving the processed audio from the network service at the audio processing plug-in shim; and providing the processed audio from the audio processing plug-in shim to the plug-in host application.

Clause 9. The computer-implemented method of clause 8, further comprising: providing, by way of the audio processing plug-in shim, a user interface (UI) for receiving configuration parameters, the configuration parameters specifying an order in which two or more of the audio processing plug-ins are to process the digital audio; receiving the configuration parameters by way of the UI; and transmitting the configuration parameters to the network service, whereby the network service configures the two or more audio processing plug-ins to process the digital audio in the order specified by the configuration parameters.

Clause 10. The computer-implemented method of clause 8 or 9, wherein the configuration parameters specify that the two or more audio processing plug-ins are to process the digital data in parallel.

Clause 11. The computer-implemented method of any of clauses 9-10, wherein the configuration parameters specify that the two or more audio processing plug-ins are to process the digital data in series.

Clause 12. The computer-implemented method of any of clauses 9-11, further comprising: providing, by way of the audio processing plug-in shim, a user interface (UI) for receiving plug-in settings, the plug-in settings specifying a configuration for the one or more audio processing plug-ins; receiving the plug-in settings by way of the UI; and transmitting the plug-in settings to the network service, whereby the network service configures operation of the one or more audio processing plug-ins based upon the plug-in settings.

Clause 13. The computer-implemented method of any of clauses 9-12, wherein the audio processing plug-in shim operates in series with one or more other audio processing plug-ins executing on the computing device.

Clause 14. The computer-implemented method of any of clauses 9-13, wherein the audio processing plug-in shim operates in parallel with one or more other audio processing plug-ins executing on the computing device.

Clause 15. A system, comprising: at least one processor; and a computer-readable storage medium having computer-executable instructions stored thereupon which, when executed by the at least one processor, cause the processor to: expose a network services application programming interface (API) for processing digital audio using one or more audio processing plug-ins executing in a distributed computing environment; receive a request from an audio processing plug-in shim at the API to process the digital audio using the one or more audio processing plug-ins executing in the distributed computing environment; and responsive to receiving the request at the API, provide the digital audio to the one or more audio processing plug-ins executing in the distributed computing environment, receive processed audio from the one or more audio processing plug-ins, and provide the processed audio to the audio processing plug-in shim in response to the request received at the network services API.

Clause 16. The system of clause 15, wherein the computer-readable storage medium has further computer-executable instructions stored thereupon to: receive configuration parameters at the network services API from the audio processing plug-in shim, the configuration parameters specifying an order in which two or more of the audio processing plug-ins are to process the digital audio; and configure the two or more audio processing plug-ins to process the digital audio in the order specified by the configuration parameters received at the network services API.

Clause 17. The system of clauses 15 or 16, wherein the configuration parameters specify that the two or more audio processing plug-ins are to process the digital data in parallel.

Clause 18. The system of any of clauses 15-17, wherein the configuration parameters specify that the two or more audio processing plug-ins are to process the digital data in series.

Clause 19. The system of any of clauses 15-18, wherein the computer-readable storage medium has further computer-executable instructions stored thereupon to: receive plug-in settings at the network services API from the audio processing plug-in shim, the plug-in settings specifying a configuration for the one or more audio processing plug-ins; and configure operation of the one or more audio processing plug-ins based upon the plug-in settings received at the network services API.

Clause 20. The system of any of clauses 15-19, wherein the audio processing plug-in shim operates in series or parallel with one or more other audio processing plug-ins executing on the computing device.

Based on the foregoing, it should be appreciated that various technologies for processing digital audio using audio processing plug-ins executing in a distributed computing environment have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting.

Various modifications and changes can be made to the subject matter described herein without following the example configurations and applications illustrated and described, and without departing from the scope of the present disclosure, which is set forth in the following claims.

What is claimed is:

1. A computer-implemented method, comprising:
    selecting, from a plurality of audio processing plug-ins, one or more audio processing plug-ins for execution on a computing device and one or more audio processing plug-ins for execution in a distributed computing environment based on computing resource requirements of the plurality of audio processing plug-ins and capabilities of the computing device;
    causing the one or more audio processing plug-ins selected for execution on the computing device to be executed in association with a plug-in host application executing on the computing device;
    causing the one or more audio processing plug-ins selected for execution in the distributed computing environment to be executed in the distributed computing environment;
    executing, on the computing device, an audio processing plug-in shim configured for operation with the plug-in host application executing on the computing device;
    receiving digital audio from the plug-in host application at the audio processing plug-in shim;
    transmitting the digital audio from the audio processing plug-in shim to a network service executing in the distributed computing environment, the network service configured to cause the one or more audio processing plug-ins executing in the distributed computing environment to process the digital audio to generate processed audio;
    receiving the processed audio from the network service at the audio processing plug-in shim; and
    providing the processed audio from the audio processing plug-in shim to the plug-in host application.

2. The computer-implemented method of claim 1, further comprising:
    providing, by way of the audio processing plug-in shim, a user interface (UI) for receiving plug-in settings, the plug-in settings specifying a configuration for the two or more audio processing plug-ins;
    receiving the plug-in settings by way of the UI; and
    transmitting the plug-in settings to the network service, whereby the network service configures operation of the two or more audio processing plug-ins based upon the plug-in settings.

3. The computer-implemented method of claim 1, wherein the audio processing plug-in shim operates in series with one or more other audio processing plug-ins executing on the computing device.

4. The computer-implemented method of claim 1, wherein the audio processing plug-in shim operates in parallel with one or more other audio processing plug-ins executing on the computing device.

5. The computer-implemented method of claim 1, wherein the plug-in host selects the one or more audio processing plug-ins to be executed on the computing device and the one or more audio processing plug-ins to be executed in the distributed environment.

6. The computer-implemented method of claim 1, wherein the audio processing plug-in shim selects the one or more audio processing plug-ins to be executed on the computing device and one or more audio processing plug-ins to be executed in the distributed environment.

7. A computing device, comprising:
    at least one processor; and
    a computer-readable storage medium having computer-executable instructions stored thereupon which, when executed by the at least one processor, cause the system to:
        select, from a plurality of audio processing plug-ins, one or more audio processing plug-ins for execution on the computing device and one or more audio processing plug-ins for execution in a distributed computing environment based on computing resource requirements of the plurality of audio processing plug-ins and capabilities of the computing device;
        cause the one or more audio processing plug-ins selected for execution on the computing device to be executed in association with a plug-in host application executing on the computing device;
        cause the one or more audio processing plug-ins selected for execution in the distributed computing environment to be executed in the distributed computing environment;
        execute, on the computing device, an audio processing plug-in shim configured for operation with the plug-in host application executing on the computing device;
        receive digital audio from the plug-in host application at the audio processing plug-in shim;
        transmit the digital audio from the audio processing plug-in shim to a network service executing in the distributed computing environment, the network service configured to cause the one or more audio processing plug-ins executing in the distributed computing environment to process the digital audio to generate processed audio;
        receive the processed audio from the network service at the audio processing plug-in shim; and
        provide the processed audio from the audio processing plug-in shim to the plug-in host application.

8. The computing device of claim 7, wherein the plug-in host selects the one or more audio processing plug-ins to be executed on the computing device and the one or more audio processing plug-ins to be executed in the distributed environment.

9. The computing device of claim 7, wherein the audio processing plug-in shim selects the one or more audio processing plug-ins to be executed on the computing device and the one or more audio processing plug-ins to be executed in the distributed environment.

10. A computer-readable storage medium having computer-executable instructions stored thereupon which, when executed by at least one processor of a computing device, cause the computing device to:
    select, from a plurality of audio processing plug-ins, one or more audio processing plug-ins for execution on the computing device and one or more audio processing plug-ins for execution in a distributed computing environment based on computing resource requirements of the plurality of audio processing plug-ins and capabilities of the computing device;
    cause the one or more audio processing plug-ins selected for execution on the computing device to be executed in association with a plug-in host application executing on the computing device;

cause the one or more audio processing plug-ins selected for execution in the distributed computing environment to be executed in the distributed computing environment;

execute, on the computing device, an audio processing plug-in shim configured for operation with the plug-in host application executing on the computing device;

receive digital audio from the plug-in host application at the audio processing plug-in shim;

transmit the digital audio from the audio processing plug-in shim to a network service executing in the distributed computing environment, the network service configured to cause the one or more audio processing plug-ins executing in the distributed computing environment to process the digital audio to generate processed audio;

receive the processed audio from the network service at the audio processing plug-in shim; and provide the processed audio from the audio processing plug-in shim to the plug-in host application.

11. The computer-readable storage medium of claim 10, wherein the plug-in host selects the one or more audio processing plug-ins to be executed on the computing device and the one or more audio processing plug-ins to be executed in the distributed environment.

12. The computer-readable storage medium of claim 10, wherein the audio processing plug-in shim selects the one or more audio processing plug-ins to be executed on the computing device and the one or more audio processing plug-ins to be executed in the distributed environment.

* * * * *